US 9,870,771 B2

(12) United States Patent
Zhou

(10) Patent No.: US 9,870,771 B2
(45) Date of Patent: Jan. 16, 2018

(54) ENVIRONMENT ADAPTIVE SPEECH RECOGNITION METHOD AND DEVICE

(71) Applicant: HUAWEI TECHNOLOGIES CO., LTD., Shenzhen (CN)

(72) Inventor: Junyang Zhou, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/149,599

(22) Filed: May 9, 2016

(65) Prior Publication Data

US 2016/0253995 A1   Sep. 1, 2016

Related U.S. Application Data

(63) Continuation of application No. PCT/CN2014/083509, filed on Aug. 1, 2014.

(30) Foreign Application Priority Data

Nov. 14, 2013 (CN) .......................... 2013 1 0573521

(51) Int. Cl.
*G10L 15/20* (2006.01)
*H04R 3/00* (2006.01)
(Continued)

(52) U.S. Cl.
CPC .............. *G10L 15/20* (2013.01); *G10L 21/02* (2013.01); *G10L 21/0216* (2013.01); *G10L 21/0224* (2013.01); *H04R 3/00* (2013.01)

(58) Field of Classification Search
CPC ..................................................... G10L 15/20
(Continued)

(56) References Cited

U.S. PATENT DOCUMENTS 7,797,305 B2 * 9/2010 Basson .................. G10L 15/22
707/713
8,660,842 B2 * 2/2014 Raux ....................... G10L 15/07
704/211

(Continued)

FOREIGN PATENT DOCUMENTS

CN      1339774 A      3/2002
CN      1397929 A      2/2003
(Continued)

OTHER PUBLICATIONS

International Search Report dated Nov. 3, 2014, in corresponding International Application No. PCT/CN2014/083509.
(Continued)

*Primary Examiner* — Susan McFadden
(74) *Attorney, Agent, or Firm* — Staas & Halsey LLP

(57) ABSTRACT

A speech recognition method, a speech recognition device, and an electronic device. In this method, first determining is performed by using a sample environment corresponding to a detection speech and a previous environment type, so as to output a corresponding speech correction instruction to a speech engine; then, a to-be-recognized speech is input to the speech engine and a noise type detection engine at the same time, and the speech engine corrects the to-be-recognized speech by using the speech correction instruction, so that quality of an original speech is not impaired by noise processing, and a corresponding initial recognition result is output; the noise type detection engine determines a current environment type by using the to-be-recognized speech and a speech training sample under a different environment; finally, confidence of the initial recognition result is adjusted by using the current environment type.

17 Claims, 7 Drawing Sheets

(51) Int. Cl.
*G10L 21/02* (2013.01)
*G10L 21/0216* (2013.01)
*G10L 21/0224* (2013.01)

(58) Field of Classification Search
USPC .......................................................... 704/233
See application file for complete search history.

(56) References Cited

U.S. PATENT DOCUMENTS

| | | | |
|---|---|---|---|
| 9,516,413 B1* | 12/2016 | Iyengar | .................. H04W 4/02 |
| 2002/0065584 A1 | 5/2002 | Kellner et al. | |
| 2003/0236099 A1 | 12/2003 | Deisher et al. | |
| 2004/0138882 A1 | 7/2004 | Miyazawa | |
| 2007/0073539 A1 | 3/2007 | Chengalvarayan et al. | |
| 2009/0030679 A1 | 1/2009 | Chengalvarayan et al. | |
| 2010/0088093 A1 | 4/2010 | Lee et al. | |

FOREIGN PATENT DOCUMENTS

| | | | |
|---|---|---|---|
| CN | 1692407 A | 11/2005 | |
| CN | 1941079 A | 4/2007 | |
| CN | 101354887 A | 1/2009 | |
| CN | 101710490 A | 5/2010 | |
| CN | 101951422 A | 1/2011 | |
| CN | 203219384 U | 9/2013 | |
| CN | 103632666 A | 3/2014 | |
| EP | 2 894 449 A1 | 7/2015 | |
| JP | 54-91006 | 7/1979 | |
| JP | 2-176796 | 7/1990 | |
| JP | 3-138698 | 6/1991 | |
| JP | 4-156600 | 5/1992 | |
| JP | 9-54598 | 2/1997 | |
| JP | 2004206063 | 7/2004 | |
| JP | 201148008 | 3/2011 | |

OTHER PUBLICATIONS

International Search Report dated Nov. 3, 2014 in corresponding International Patent Application No. PCT/CN2014/083509.
Chinese Office Action dated Nov. 18, 2015 in corresponding Chinese Patent Application No. 201310573521.1.
Extended European Search Report dated Aug. 21, 2015 in corresponding European Patent Application No. 14812390.4.
Xu et al., "Noise Condition-Dependent Training Based on Noise Classification and SNR Estimation", IEEE Transactions on Audio, Speech, and Language Processing, vol. 15, No. 8, IEEE, Nov. 2007, pp. 1-13.
Sameti et al., "HMM-Based Strategies for Enhancement of Speech Signals Embedded in Nonstationary Noise", IEEE Transactions on Speech and Audio Processing, vol. 6, No. 5, IEEE, Sep. 1998, pp. 1-11.
Notice of Allowance, dated Nov. 21, 2017, in Japanese Application No. 2016530971, pp. 1-3.

* cited by examiner

ENVIRONMENT ADAPTIVE SPEECH RECOGNITION METHOD AND DEVICE

CROSS-REFERENCE TO RELATED APPLICATIONS

This application is a continuation of International Application No. PCT/CN2014/083509, filed on Aug. 1, 2014, which claims priority to Chinese Patent Application No. 201310573521.1, filed on Nov. 14, 2013, both of which are hereby incorporated by reference in their entireties.

TECHNICAL FIELD

The embodiment of the invention relates to the field of speech recognition technologies, and in particular, to a speech recognition method, a speech recognition device, and an electronic device.

BACKGROUND

At present, most of various electronic products on the market can be controlled and operated in a speech recognition manner. However, in a speech recognition process, for different environment types, especially in a strong noise environment type, an ordinary speech recognition engine is easily interfered by environment noise, and a speech recognition rate is significantly reduced compared with a speech recognition rate in a quiet environment.

In the prior art, a signal-to-noise ratio (SNR) value of an input speech is improved primarily in a noise reduction processing manner or a speech level enhancement manner, so as to improve a speech recognition rate.

In a noise reduction processing process, a noise reducing module is used to reduce environment noise and improve an SNR value of an input speech by using a noise reduction algorithm for reducing a speech waveform, so as to improve a speech recognition rate and a recognition effect of a speech engine. In addition, when a noise reduction algorithm is used to enhance speech quality, a manner of using a set parameter prior to speech recognition to determine whether a speech recognition engine enables a noise reducing module also exists in the prior art. In a speech level enhancement process, an SNR value is improved in a manner of speech level enhancement.

In the foregoing two methods used in the prior art, a speech recognition rate can be improved slightly in a strong noise environment, but in a relatively-low noise environment or in a quiet condition, noise reduction processing is performed by using a method for reducing a speech waveform, so as to reduce environment noise. In this method, an original speech is impaired, thereby reducing a speech recognition rate; and in a speech level enhancement manner, quality of an original speech may also be impaired, and an effect of improving a speech recognition rate by using the speech level enhancement manner is lower than destruction of the quality of the original speech.

It can be learned that currently, a speech recognition manner which can improve a speech recognition effect in various environments and ensure stable speech recognition and good user experience in various environments is urgently needed.

SUMMARY

In view of this, an objective of embodiments of the present invention is to provide a speech recognition method, a speech recognition device, and an electronic device, so as to overcome a problem in the prior art that a speech recognition manner cannot ensure stable speech recognition and good user experience under various environments.

To achieve the foregoing objective, the embodiments of the present invention provide the following technical solutions:

A first aspect of the embodiments of the present invention provides a speech recognition method, including: acquiring a detection speech and a to-be-recognized speech by dividing an input speech, where a length of speech data included in the detection speech is less than a length of speech data included in the to-be-recognized speech;

selecting, by a noise type detection engine after comparing the acquired detection speech with a speech training sample under a different sample environment, a sample environment corresponding to a speech training sample that has a minimum difference with the detection speech as a detection environment type, where the sample environment includes a quiet environment and a noise environment;

detecting a storage area, and outputting, when a recognizable previous environment type exists in the storage area, a speech correction instruction according to a result of comparison between the detection environment type and the previous environment type, where the previous environment type is a quiet environment or a noise environment;

controlling, by a speech engine, correction on the to-be-recognized speech according to the speech correction instruction, and outputting an initial recognition result;

separately comparing, by the noise type detection engine, the received to-be-recognized speech with a speech training sample under a different sample environment, and selecting a sample environment corresponding to a speech training sample that has a minimum difference with the to-be-recognized speech, as a current environment type;

storing the current environment type to the storage area, and abandoning the current environment type after preset duration; and outputting a final recognition result after a confidence value of the initial recognition result is adjusted according to the current environment type.

A second aspect of the embodiments of the present invention provides a speech recognition device, including:

a processor, configured to acquire a detection speech and a to-be-recognized speech by sampling an input speech, and input the detection speech and the to-be-recognized speech into a noise type detection engine and a speech engine at the same time; configured to detect a storage area, and output, when a recognizable previous environment type exists in the storage area, a speech correction instruction according to a result of comparison between a detection environment type output by the noise type detection engine and the previous environment type; and configured to output a final recognition result after a confidence value of an initial recognition result output by the speech engine is adjusted according to an current environment type output by the noise type detection engine, where a length of speech data included in the detection speech is less than a length of speech data included in the to-be-recognized speech, and the previous environment type is a quiet environment or a noise environment;

the noise type detection engine, configured to compare the detection speech and the to-be-recognized speech that are output by the processor with a speech training sample under a different sample environment; select a sample environment corresponding to a speech training sample that has a minimum difference with the detection speech, as a detection environment type; select a sample environment corresponding to a speech training sample that has a minimum difference with the to-be-recognized speech, as a current environment type; and store the current environment type to the storage area and abandon the current environment type after preset duration; and the speech engine, configured to control correction on the received to-be-recognized speech according to the speech correction instruction output by the processor, and output an initial recognition result.

A third aspect of the embodiments of the present invention provides an electronic device, including the speech recognition device according to the second aspect of the embodiments of the present invention, a speech recording device connected to the speech recognition device, and a microphone connected to the speech recording device.

It can be learned from the foregoing technical solutions that, compared with the prior art, the embodiments of the present invention disclose a speech recognition method, a speech recognition device, and an electronic device. In this method, first an input speech is divided; then determining is performed on a current detection environment by using a detection speech obtained by means of division; a current detection environment type is compared with a previous environment type in a case that a previously recorded environment type exists; a speech correction instruction obtained according to comparison result is sent to a speech engine; the speech engine corrects a to-be-recognized speech by using the speech correction instruction, so that quality of an original speech is not impaired during noise processing, and a corresponding initial recognition result is output; a to-be-recognized speech obtained by means of division is input to the speech engine and a noise type detection engine at the same time; the noise type detection engine determines a current environment type by using the to-be-recognized speech and a speech training sample under a different environment; finally, confidence of the initial recognition result is adjusted by using the current environment type, so as to ensure that a recognition effect of a finally output speech recognition result can provide good user experience for a user under a current environment.

BRIEF DESCRIPTION OF DRAWINGS

To describe the technical solutions in the embodiments of the present invention more clearly, the following briefly introduces the accompanying drawings required for describing the embodiments. Apparently, the accompanying drawings in the following description show merely the embodiments of the present invention, and a person of ordinary skill in the art may still derive other drawings from these accompanying drawings without creative efforts.

DESCRIPTION OF EMBODIMENTS

For reference and clarity, descriptions, shortenings, or abbreviations of technical terms used in the following are summarized as follows:

SNR: Signal to Noise Ratio, signal to noise ratio;

SSE: Speech Signal Enhancement, speech signal enhancement;

NTD: Noise Type Detect, noise type detection; and dB: Decibel, decibel.

The following clearly and completely describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

It can be learned from the background that in the prior art, under a relatively quiet environment, an original speech is impaired in both a noise reduction manner and a speech level enhancement manner. That is, in the prior art, a method used for improving a speech recognition rate or improving a speech recognition effect cannot acquire a same effect under various environments. Only when there is a relatively high noise, good speech recognition experience can be provided for a user; and if being in a quieter environment, the user perceives poorer speech recognition experience.

Therefore, an embodiment of the present invention provides a speech recognition method, where an instruction about whether to perform related processing on a current input speech is acquired by determining an environment of the current input speech and an environment of a previous input speech, and therefore it is implemented that the current input speech is processed according to a result of the determining, so that it can be implemented that under various environments, an original speech of the current input speech is not impaired, and a high recognition rate and recognition effect of the current input speech are ensured. In this way, that adaptive adjustment can be performed on speech recognition in various environments can be ensured, so that a user can obtain good speech application experience.

Embodiment 1

Figure 1:
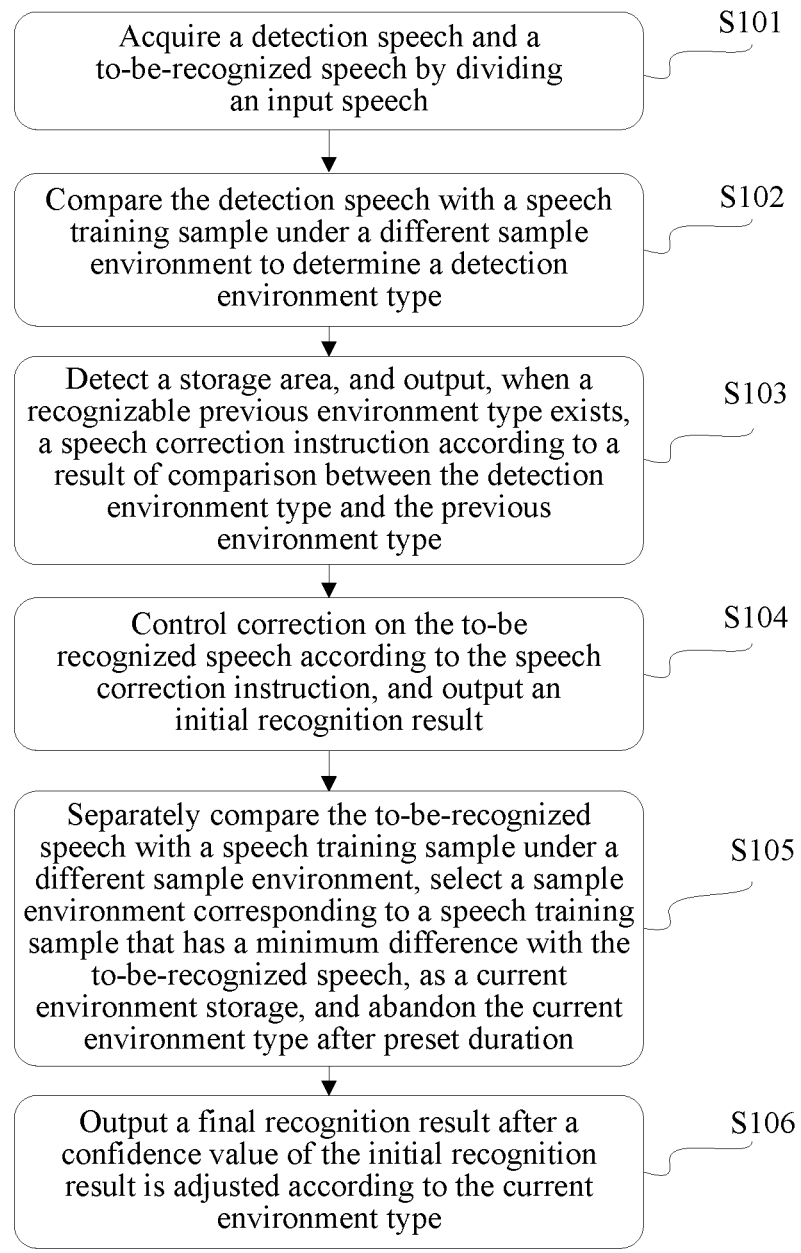
FIG. 1 is a flowchart of a speech recognition method disclosed in Embodiment 1 of the present invention.

As shown in FIG. 1, FIG. 1 is a flowchart of a speech recognition method disclosed in Embodiment 1 of the present invention, and the method mainly includes the following steps:

Step S101: Acquire a detection speech and a to-be-recognized speech by dividing an input speech.

In step S101, a processor divides the current input speech, and the current input speech is divided into two parts: One part is used as the detection speech, and the other part is used as the to-be-recognized speech. It should be noted that, as a detection speech, the detection speech is merely a small part of audio data in the current input speech, a length of the detection speech is less than a length of the to-be-recognized speech, that is, a length of speech data included in the detection speech is less than a length of speech data included in the to-be-recognized speech.

For example, if the length of the current input speech is 100 frames, speech data with a length of the first 5 frames may be selected as the detection speech, and speech data with a length of the remaining 95 frames is used as the to-be-recognized speech. Definitely, data of 10 to 15 frames selected from the speech may also be used as the detection speech according to a requirement, and a percentage of the detection speech may be set according to a requirement. A setting premise is that the length of the detection speech does not affect subsequent entire input speech recognition.

In addition, during selecting the detection speech, a most convenient manner is as follows: A speech of a preset length is directly selected from the beginning of the entire speech as the detection speech, but this embodiment of the present invention is not limited thereto; and a small part of audio data belonging to the current input speech may be acquired as the detection speech in a manner of selecting from an end of the entire speech.

Step S102: After comparing the acquired detection speech with a speech training sample under a different sample environment, an NTD engine selects a sample environment corresponding to the speech training sample that has a minimum difference with the detection speech, as a sample environment type.

In step S102, after acquiring the detection speech, the NTD engine compares the detection speech with a speech training sample under a different sample environment. The speech training sample under a different sample environment refers to a result obtained by training speech files live recorded under various environments. A process of training the speech files live recorded under various environments is as follows: Under a quiet environment, the NTD engine calculates a noise type detection result of a recorded speech sample file under the quiet environment, and effective impact duration of the quiet environment on recognition of the speech sample file; under a noise environment, the NID engine calculates a noise type detection result of the recorded speech sample file under the noise environment, and effective impact duration of the noise environment on recognition of the speech sample file.

That is, results of speech training samples under different sample environments are used as a basis for determining a current sampling environment. By means of comparison, when a result obtained after the NTD engine calculates the acquired detection speech is closer to a result of a speech training sample under a sample environment, an environment under which the detection speech is input may be considered to be the same as the sample environment. Based on this, in this embodiment of the present invention, a difference between a result corresponding to the detection speech and the result of the speech training sample is compared, and an environment type corresponding to a speech sample that has a minimum difference is selected as the environment under which the detection speech is input, that is, a detection environment type for a subsequent use.

However, this embodiment of the present invention is not merely limited to: a difference comparison manner is used to select an environment type that has a closest result. The an environment type may also be selected in another manner, only if it is ensured that a sample environment corresponding to a speech training sample result that is infinitely close to a calculation result of the detection speech is the environment under which the detection speech is input.

The sample environment includes a quiet environment and a noise environment; and the noise environment includes a vehicle-mounted low noise environment, a vehicle-mounted high noise environment, an ordinary roadside environment, a busy roadside environment, and a noisy environment.

Step S103: Detect a storage area, and output, when a recognizable previous environment type exists in the storage area, a speech correction instruction according to a result of comparison between the detection environment type and the previous environment type.

In step S103, the environment type includes a quiet environment or a noise environment, and a specific environment type is related to previously-performed speech recognition. The processor acquires the recognizable previous environment type by detecting the NTD engine, that is, an environment type stored at the time of the previously-performed speech recognition exists. The processor compares the detection environment type acquired from the NTD engine with the previous environment type, and separately generates a different speech correction instruction according to impact of the previous environment type on a current detection environment, so that a speech engine can subsequently use the speech correction instructions to perform corresponding corrections on the to-be-recognized speech.

The speech correction instruction mainly includes an instruction for a speech engine to enable speech quality enhancement and an instruction for a speech engine to disable noise reduction processing.

Step S104: A speech engine controls correction on the to-be-recognized speech according to the speech correction instruction, and outputs an initial recognition result.

In step S104, the speech engine receives the to-be-recognized speech and the speech correction instruction that are sent by the processor, and uses the speech correction instruction to control correction on the to-be-recognized speech, so as to output the initial recognition result for primary processing.

It should be noted that, the length of the to-be-recognized speech meets a requirement for recognizing an original input speech; time for receiving the to-be-recognized speech and the speech correction instruction by the speech engine depends on time for sending the to-be-recognized speech and the speech correction instruction by the processor.

By performing step S104, the speech correction instruction output according to step S103 after determining is performed on the detection environment type and the previous environment type is used to process the to-be-recognized speech.

In consideration of impact of both the previous environment type and the detection environment type on the to-be-recognized speech, an impairment to an original speech that is caused in the prior art when an input speech is directly processed without considering an environment is reduced in a process of processing the to-be-recognized speech.

That is, after step S104 and step S103 disclosed in this embodiment of the present invention are performed, a speech recognition rate can be improved under a different environment without impairing quality of the original speech. The recognition rate is a measurement value for evaluating an effect of a recognition result. A manner without impairing the quality of the original speech is used to improve the recognition rate, which can ensure that validity of final speech recognition can be ensured when the initial recognition result is subsequently processed.

Step S105: The NTD engine separately compares the received to-be-recognized speech with a speech training sample under a different sample environment, selects a sample environment corresponding to the speech training sample that has a minimum difference with the to-be-recognized speech, as a current environment type, and stores the current environment type to the storage area and abandons the current environment type after preset duration. In step S105, a principle and a process of separately comparing, by the NTD engine, the received to-be-recognized speech with a speech training sample under a different sample environment are the same as a principle and a process of performing comparing, by the NTD engine, the detection speech with a speech training sample under a different sample environment in step S103. Reference may be made to step S103, and details are not described herein again.

In a comparing process, it is determined that an environment type corresponding to the speech training sample is the current environment type. In this case, various types of information such as the current environment type and effective impact duration of the current environment type on the to-be-recognized speech is stored. In a storing process, if a current storage area stores old information such as the previous environment type and information related to the previous environment type, the old information is replaced with the currently-determined current environment type and information related to the currently-determined current environment type; in the storing process, if the current storage area is empty without any information, the currently-determined environment type and the information related to the currently-determined environment type are directly stored, and the currently-stored information is abandoned after preset storage duration.

The preset storage duration may be set according to different requirements. Generally, whether the preset storage duration may affect recognition of a speech input next time needs to be considered for setting the preset storage duration. For example, the currently-stored environment type is used as a previous environment type for the recognition of a speech input next time, and reference is made to step S103. In a more preferred manner, the preset storage duration is set according to effective impact duration of different environment types on the to-be-recognized speech. A specific length of the preset storage duration may be the same as a length of effective impact duration of the currently-stored environment type on the to-be-recognized speech, may also be longer than the effective impact duration, and generally, is not less than the effective impact duration. The preset storage duration when the current environment type is a quiet environment is longer than the preset storage duration when the current environment type is a noise environment.

It should be noted that, the to-be-recognized speech received in the foregoing step S104 and step S105 is input into the NTD engine and the speech engine by the processor at the same time; step S104 and step S105 are merely used to provide a clear citation in a process of subsequently describing the technical solutions in the embodiments of the present invention; and no limitation is set on a sequence of performing step S104 and step S105. Performing processes of step S104 and step S105 have no sequence, step S104 and step S105 may be performed at the same time, and step S104 and step S105 may also not be performed at the same time.

Step S106: Output a final recognition result after a confidence value of the initial recognition result is adjusted according to the current environment type.

In step S106, the processor adjusts the confidence value of the initial recognition result output by the speech engine according to the current environment type stored in the NTD engine, and the confidence value is a measurement value for evaluating reliability of a recognition result. The initial recognition result with validity is output after the speech recognition rate is improved by performing step S104, and further, the final speech recognition result is output after the confidence value of the initial recognition result is increased by performing step S106.

According to a speech recognition method disclosed in Embodiment 1 of the present invention, under a co-action of a detection environment type of a current input speech and a recognizable previous environment type, a speech correction instruction used to instruct a speech engine whether to correct a to-be-recognized speech is provided, thereby ensuring validity of an initial recognition result output at a high recognition rate; and then confidence of the initial recognition result is adjusted according to a current environment type acquired according to a calculation result of an NTD engine, so as to acquire a final recognition result with a high recognition rate and recognition effect for the current input speech, and therefore, it is ensured that under various environments, adaptive adjustment can be performed on speech recognition, so that a user can obtain good speech application experience.

Embodiment 2

Figure 2:
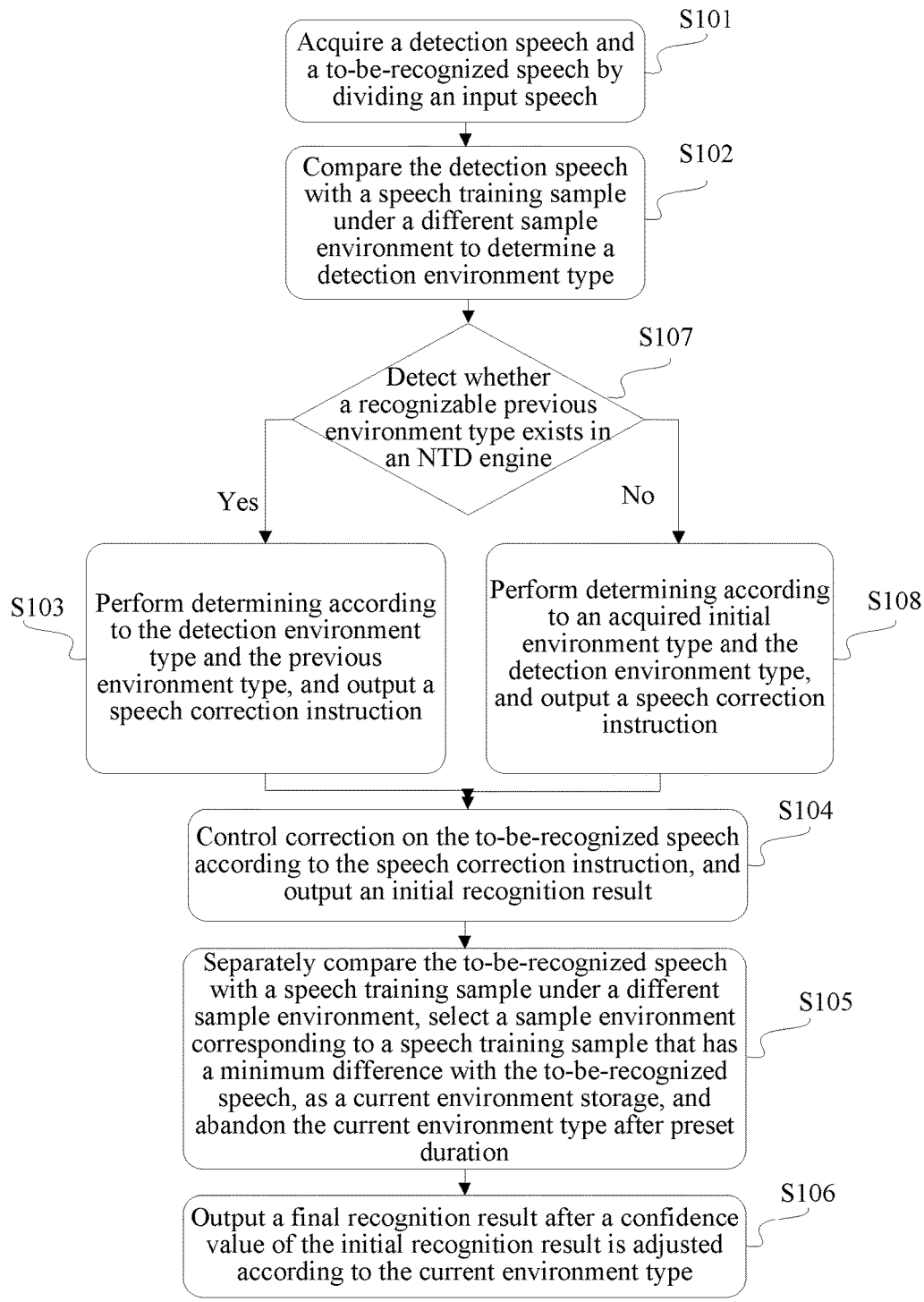
FIG. 2 is a flowchart of a speech recognition method disclosed in Embodiment 2 of the present invention.

As shown in FIG. 2, FIG. 2 is a flowchart of a speech recognition method disclosed in Embodiment 2 of the present invention, and the method mainly includes the following steps:

Step S101: Acquire a detection speech and a to-be-recognized speech by sampling an input speech.

Step S102: After comparing the acquired detection speech with a speech training sample under a different sample environment, an NTD engine selects a sample environment corresponding to the speech training sample that has a minimum difference with the detection speech, as a detection environment type.

Step S107: Detect whether a recognizable previous environment type exists in the NTD engine; if the recognizable previous environment type exists in the NTD engine, perform step S103; and if the recognizable previous environment type does not exist in the NTD engine, perform step S108.

In step S107, a processor detects whether a recognizable previous environment type exists in the NTD engine; when existence of the previous environment type is not recognized for a long time, it indicates that the previous environment type has no effect on current speech recognition; and when a new speech is input, an initial environment type is used as a backup determining condition when step S108 is performed.

Step S103: When the recognizable previous environment type exists, perform determining according to the detection environment type and the previous environment type, and output a speech correction instruction.

Step S108: When the previous environment type is not recognized, acquire an initial environment type, perform determining according to the initial environment type and the detection environment type, and output a speech correction instruction.

Step S104: A speech engine controls correction on the to-be-recognized speech according to the speech correction instruction, and outputs an initial recognition result.

Step S105: The NTD engine separately compares the received to-be-recognized speech with a speech training sample under a different sample environment, selects a sample environment corresponding to the speech training sample that has a minimum difference with the to-be-recognized speech, as a current environment type, and stores the current environment type to a storage area and abandons the current environment type after preset duration.

Step S106: Output a final recognition result after a confidence value of the initial recognition result is adjusted according to the current environment type.

A principle and a process of performing step S101 to step S106 shown in the foregoing FIG. 2 are the same as a principle and a process of performing step S101 to step S106 shown in FIG. 1, and details are not described herein again. It should be noted that the speech correction instruction in step S104 may also be the speech correction instruction output by performing step S108, but a meaning of the speech correction instruction is the same as a meaning of the speech correction instruction output by performing step S103. The speech correction instruction mainly includes an instruction for a speech engine to enable speech quality enhancement and an instruction for a speech engine to disable noise reduction processing. The speech correction instruction is generated under a co-action of the detection environment type and the initial environment type.

The initial environment type mentioned in step S108 is preset, and the initial environment type is used as a backup. When the previous environment type does not exist, the initial environment type is invoked. Generally, the initial environment type is a noise environment, and more specifically, is a noisy environment. Definitely, the initial environment type in this embodiment of the present invention is not limited thereto, and therefore, the initial environment type may also be set to a quiet environment.

Figure 3:
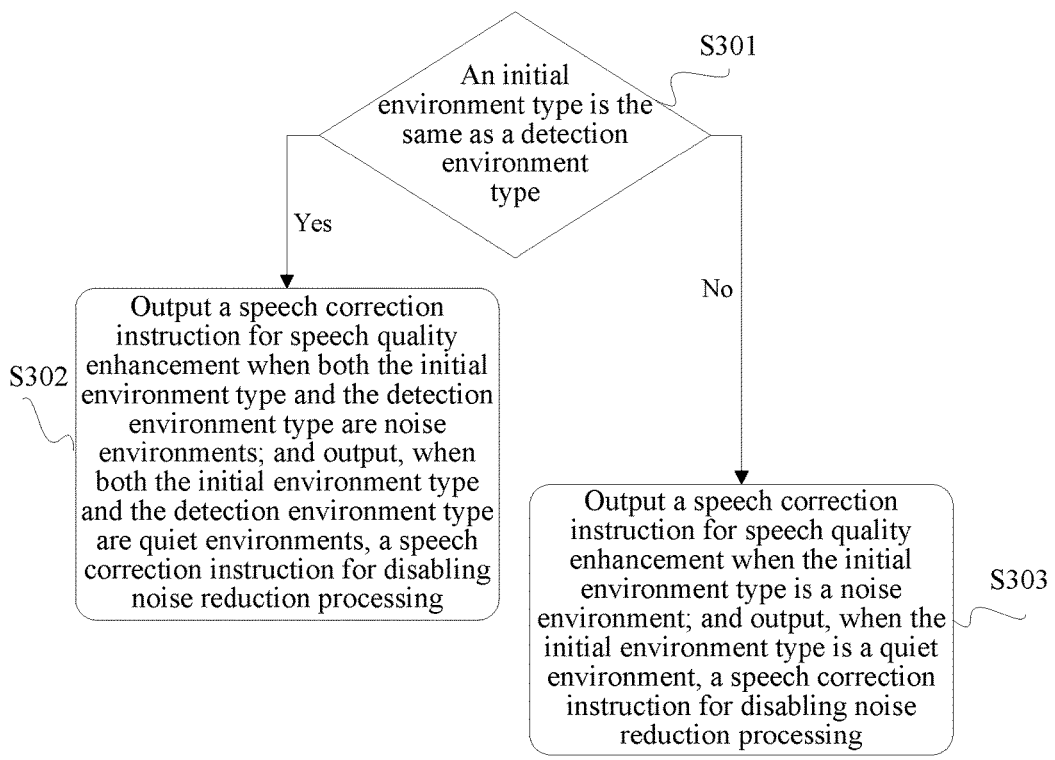
FIG. 3 is a flowchart of determining a speech correction instruction based on an initial environment type disclosed in Embodiment 2 of the present invention.

A process of performing determining according to the initial environment type and the detection environment type and outputting a speech correction instruction is shown in FIG. 3, and mainly includes:

Step S301: Determine whether the initial environment type is the same as the detection environment type; if the initial environment type is the same as the detection environment type, perform step S302; and if the initial environment type is not the same as the detection environment type, perform step S303.

Step S302: Output, when both the initial environment type and the detection environment type are noise environments, a speech correction instruction used for speech quality enhancement; and output, when both the initial environment type and the detection environment type are quiet environments, a speech correction instruction used for disabling noise reduction processing.

In step S302, speech correction instructions with different control functions are output according to different environments.

Step S303: Output, when the initial environment type is a noise environment, a speech correction instruction used for speech quality enhancement; and output, when the initial environment type is a quiet environment, a speech correction instruction used for disabling noise reduction processing.

In step S303, in a case that the initial environment type is different from the detection environment type, a type of the output speech correction instruction is determined according to a default initial environment type.

With reference to description in FIG. 2, a speech correction instruction used for speech quality enhancement or for disabling noise reduction processing is output after step S302 or step S303 is performed. After the speech correction instruction used for speech quality enhancement is sent to the speech engine, step S104 is performed. Based on the speech correction instruction, the speech engine first performs speech quality enhancement on the to-be-recognized speech, and then performs noise reduction processing. After the speech correction instruction used for disabling noise reduction processing is sent to the speech engine, step S104 is performed. Based on the speech correction instruction, the speech engine disables a process of performing noise reduction processing performed by the speech engine on the to-be-recognized speech.

In this embodiment of the present invention, it can be ensured that at the time of initial recognition or in a case that a previous noise type is abandoned when storage time of the previous noise type is longer than preset storage duration, based on a co-action of an initial environment type and a detection environment type, a speech correction instruction used for speech quality enhancement or a speech correction instruction used for disabling noise reduction processing is output, so that a speech engine performs corresponding processing on a to-be-recognized speech according to the speech correction instruction. Therefore, it is ensured that a high recognition rate is acquired in a case in which there is no impairment to an original speech, and an NTD engine performs, according to a current environment type, adaptive adjustment on a confidence value of an initial recognition result output by the speech engine, so as to ensure that a finally output speech recognition result has high reliability. Therefore, a purpose of adaptively adjusting speech recognition under various environments is achieved, and it is ensured that a user can acquire good user experience under various environments.

Embodiment 3

Figure 4:
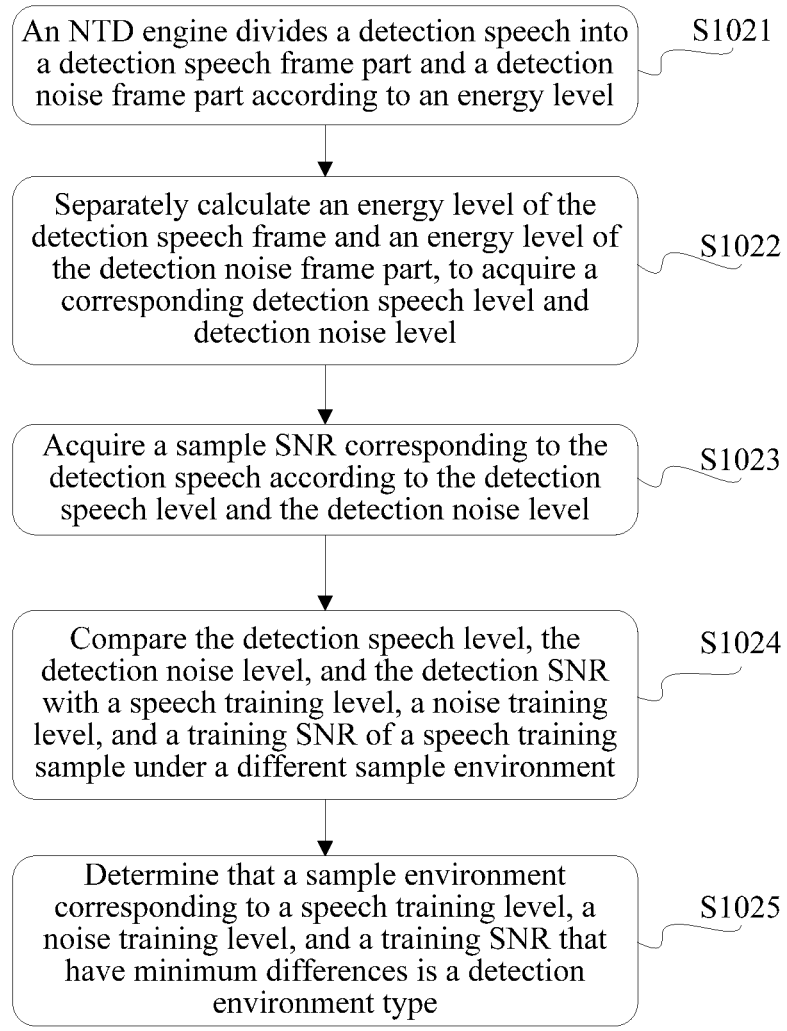
FIG. 4 is a flowchart of determining a sample environment type disclosed in Embodiment 3 of the present invention.

Based on the foregoing Embodiment 1 and/or Embodiment 2, for step S102 shown in the foregoing FIG. 1 and FIG. 2, an NTD engine selects, after comparing the acquired detection speech with a speech training sample under a different sample environment, a sample environment corresponding to the speech training sample that has a minimum difference with the detection speech, as a detection environment type; and a specific performing process thereof is shown in FIG. 4, and mainly includes:

Step S1021: The NTD engine divides the received detection speech into a detection speech frame part and a detection noise frame part according to an energy level.

Step S1022: Separately calculate an energy level of the detection speech frame part and an energy level of the detection noise frame part to acquire a corresponding detection speech level and detection noise level.

Step S1023: Acquire a detection SNR corresponding to the detection speech according to the detection speech level and the detection noise level, where the detection SNR=the detection speech level−the detection noise level.

Step S1024: Compare the detection speech level, the detection noise level, and the detection SNR with a speech training level, a noise training level, and a training SNR of a speech training sample under a different sample environment, respectively.

Step S1025: Determine that a sample environment corresponding to a speech training level that has a minimum difference with the detection speech level, a noise training level that has a minimum difference with the detection noise level, and a training SNR that has a minimum difference with the detection SNR is the detection environment type.

In step S1024, after speech files live recorded under various environments are trained, a speech training level, a noise training level, and a training SNR, which are acquired based on NTD engine calculation, of each trained speech training sample under various environments are obtained. Then, the detection speech level, the detection noise level, and the detection SNR are compared with the speech training level, the noise training level, and the training SNR of the speech training sample under a different sample environment, respectively.

It should be noted that, when a speech training sample is trained under a different sample environment, in addition to an acquired training value, effective impact duration T of the different sample environment on the speech training sample is also acquired.

Based on comparison in step S1024, step S1025 is performed to determine that a sample environment corresponding to a speech training level that has a minimum difference with the detection speech level, a noise training level that has a minimum difference with the detection noise level, and a training SNR that has a minimum difference with the detection SNR is the detection environment type. That is, it is determined which sample environment in different sample environments during training is closest to a current environment, and a sample environment closest to the current environment is selected as the detection environment type. An example is used for description herein:

There are two sample environments, namely a quiet environment and a noisy environment. For the quiet environment, a sample SNR is 15 dB, a noise sample level is −25 dB, and a speech sample level is 10 dB; and for the noisy environment, a sample SNR is 10 dB, a noise sample level is −16 dB, and a speech sample level is 10 dB. After a detection speech is calculated by an NTD engine, a detection SNR, a detection noise level, and a detection speech level of the detection speech are obtained, which are 14 dB, −23 dB, and 9 dB respectively. It can be learned, by means of comparison with training values of a same type in the quiet environment and the noisy environment, that the sample SNR of 15 dB, the noise sample level of −25 dB, and the speech sample level of 10 dB are the closest, and therefore it is determined that the quiet environment corresponding to the sample SNR of 15 dB, the noise sample level of −25 dB, and the speech sample level of 10 dB is the detection environment type.

According to a process of comparing a calculation result with a training result of the detection speech, an environment type at the time of currently inputting a speech can be accurately acquired.

Figure 5:
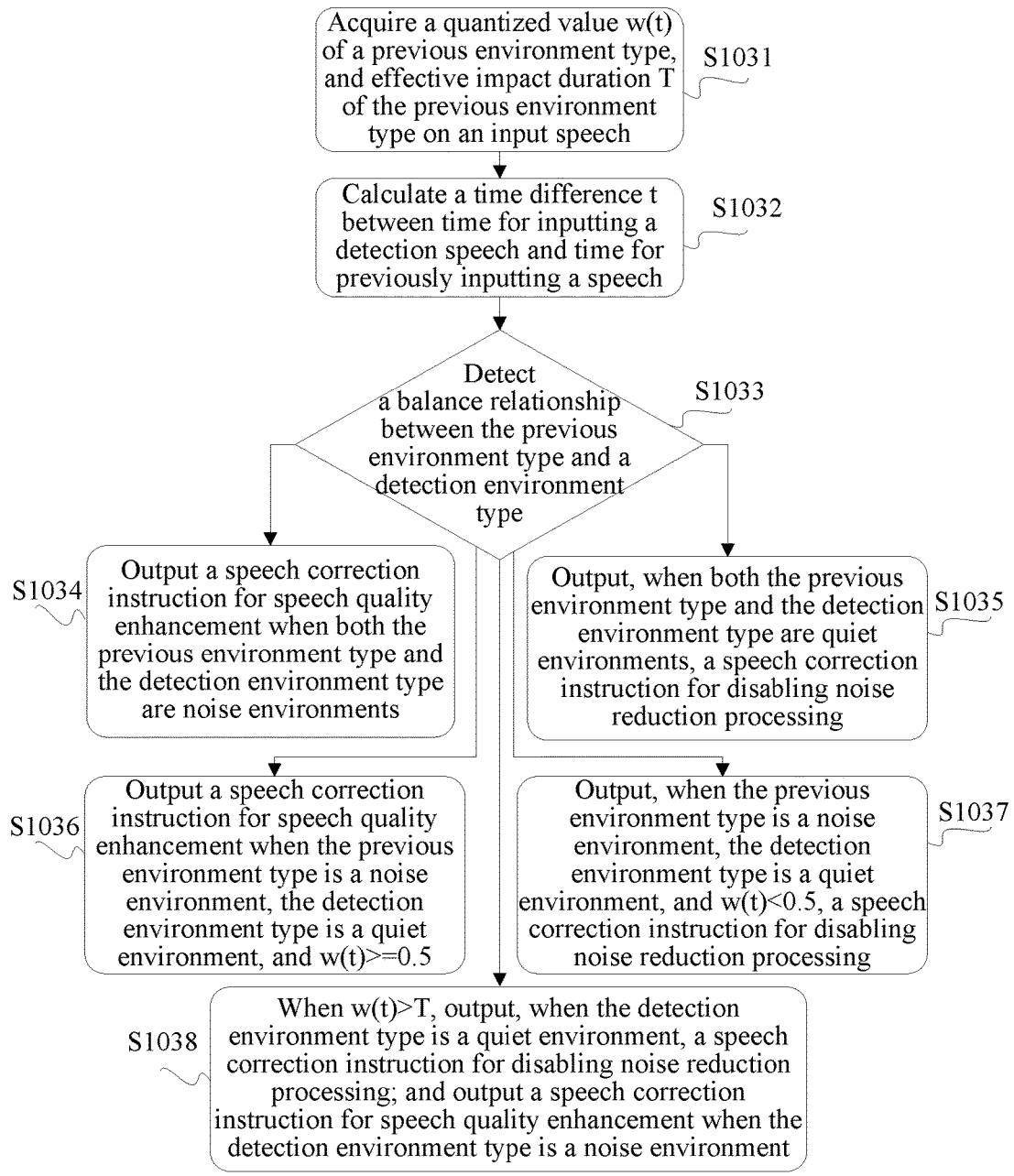
FIG. 5 is a flowchart of acquiring a speech correction instruction disclosed in Embodiment 3 of the present invention.

Similarly, based on the foregoing Embodiment 1 and/or Embodiment 2, for step S103 shown in the foregoing FIG. 1 and FIG. 2: When the recognizable previous environment type exists, perform determining according to the detection environment type and the previous environment type, and output a speech correction instruction. A specific performing process of step S103 is shown in FIG. 5, and mainly includes:

Step S1031: Acquire the previous environment type and effective impact duration T of the previous environment type on an input speech.

In step S1031, a meaning of the effective impact duration T is the same as a meaning of the effective impact duration T in step S1024 shown in FIG. 4, and both mean duration of impacts of corresponding environment types thereof on the input speech.

Theoretically, the effective impact duration T is a time decaying range of each environment type. For example, a range of a quiet environment is 20 seconds, a range of a noisy environment is 10 seconds, and a range of a roadside environment (ordinary roadside environment) is 15 seconds. The range is not limited in this embodiment of the present invention, and the value may be a statistical value obtained by means of analysis according to a speech file recorded in an actual use.

Step S1032: Calculate a time difference t between time for inputting the detection speech and time for previously inputting a speech, and an impact value w(t) of the previous environment type on the detection environment type.

In step S1032, time for inputting current detection speech may be considered as time for inputting a current speech, and a time interval between the time for inputting the current speech and the time for previously inputting a speech, namely the time difference t, is calculated. The impact value w(t) of the previous environment type on the detection environment type is a truncation function that decays with time t, a value of w(t) is obtained by training sample data of a speech training sample under a different sample environment, and values of t and T are positive integers.

It can be learned by using w(t) that, if a time interval between time for twice speech inputting is short, it is considered that a probability that the twice speech inputting are performed in a same environment is high, and determining of the previous environment type has great impact on determining of the current environment type; and if the time interval is long, the determining of the previous environment type has small or no impact on the determining of the current environment type.

Step S1033: Determine a balance relationship between the previous environment type and the detection environment type.

Step S1034: Output, when both the previous environment type and the detection environment type are noise environments, a speech correction instruction used for speech quality enhancement.

Step S1035: Output, when both the previous environment type and the detection environment type are quiet environments, a speech correction instruction used for disabling noise reduction processing.

Step S1036: Output, when the previous environment type is a noise environment, the detection environment type is a quiet environment, and w(t)>=0.5, a speech correction instruction used for speech quality enhancement.

Step S1037: Output, when the previous environment type is a noise environment, the detection environment type is a quiet environment, and w(t)<0.5, a speech correction instruction used for disabling noise reduction processing.

Step S1038: When w(t)>T, output, when the detection environment type is a quiet environment, a speech correction instruction used for disabling noise reduction processing; and output, when the detection environment type is a noise environment, a speech correction instruction used for speech quality enhancement.

Based on step S1032, the balance relationship between the previous environment type and the detection environment type is determined in step S1033. It can be learned according to a determining result in the foregoing step S1034 to step S1038 that, when the previous environment type is the same as the detection environment type, it indicates that a current environment in which speech inputting is performed is unchanged and the current environment is still the previous environment type; when the previous environment type is a noise environment, noise reduction processing still needs to be performed and a speech correction instruction used for speech quality enhancement is output; and when the previous environment type is a quiet environment, a speech correction instruction used for disabling noise reduction processing is output to avoid an impact of noise reduction processing on speech recognition.

When the previous environment type is not the same as the detection environment type, determining needs to be performed, with reference to the impact value w(t) of the previous environment type on the detection environment type, on the balance relationship between the previous environment type and the detection environment type.

w(t) is a truncation function that decays with time t, and a value of the w(t) is obtained by training sample data of a speech training sample under a different sample environment and may be specifically as follows:

w(t)=exp(−t*lamda), when t>T, w(t)=0; exp(*) is an exponential function of which a base is e, lamda is an anonymous function; and w(t) decays with time t, indicating that a previous environment type only functions in a time range.

Figure 6:
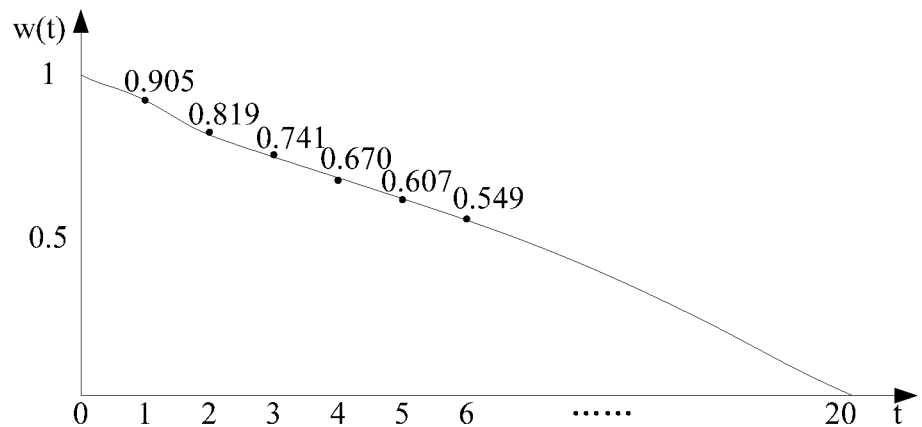
FIG. 6 is a curve graph of a relationship among a time difference t, effective impact duration T, and a weight disclosed in Embodiment 3 of the present invention.

It can be learned from FIG. 6 that, a relationship between the time difference t of performing twice speech inputting and the w(t) is a downtrend curve. When the time difference t is smaller, w(t) is larger, and an impact of the previous environment type on the current input speech is larger; and when the time difference t is larger, w(t) is smaller, and the impact of the previous environment type on the current input speech is smaller. As shown in FIG. 6, it is assumed that the anonymous function lamda=0.1, so that when t=0, w(0)=1; by analogy, w(1)=exp(−0.1)~0.905; w(2)=0.819; w(3)=0.741; w(4)=0.670; w(5)=0.607; w(6)=0.549; and if T=20, w(t)=0 when t>20.

When the time difference t>T, that is, the time difference t exceeds effective impact duration, in this case, the current input speech is not affected even though the previous environment type exists. Generally, according to storage duration of the previous environment type, it is likely that a previously-stored environment type has been abandoned.

It should be noted that the foregoing provided decay function w(t)=exp(−t*lamda) may further be extended as: W(t)=exp(−(t/det)^2, where the decay function decays faster. In an actual application process, different decay functions may be selectively used in different situations.

Five results of step S1034 to step S1038 presented in this embodiment of the present invention are merely used as preferred content when the previous environment type is used as a noise environment, and this embodiment of the present invention is not limited thereto. When the previous environment type is a quiet environment, it may also be concluded from the foregoing content that a type of a to-be-output speech correction instruction is determined by jointly using the previous environment type and the detection environment type.

According to a process of outputting a speech correction instruction presented in this embodiment of the present invention, a quantized formula is used for description, which may be specifically as follows: When a quantized value of a quiet environment is 0, and a quantized value of a noise environment is 1, the balance relationship between the previous environment type and the detection environment type is as follows:

balance=noise environment*w(t)+quiet environment;

if balance>0.5, it is considered that the balance relationship is closer to 1, that is, a noise environment, and therefore, it is determined that a current environment in which speech inputting is performed is a noise environment, and a speech correction instruction used for speech quality enhancement is output;

if balance <0.5, it is considered that the balance relationship is closer to 0, that is, a quiet environment, and therefore, it is determined that the current environment in which speech inputting is performed, and a speech correction instruction used for disabling noise reduction processing is output; and if balance=0.5, according to inertial logical processing, a current environment is the same as a previous environment, that is, if the previous environment is a noise environment, the current environment also is a noise environment, and a speech correction instruction used for speech quality enhancement is output; and if the previous environment is a quiet environment, the current environment also is a quiet environment, and a correction instruction for disabling noise reduction processing is output.

With reference to the decay function shown in FIG. 6 and description of the foregoing quantized formula, the determining process in the foregoing step S1034 to step S1038 is described by using examples:

It is assumed that effective impact duration of a quiet environment is 20 seconds and effective impact duration of a noisy environment is 10 seconds.

When the time difference t is 5 seconds, if the previous environment type is a noisy environment, T is 10 seconds, w(t) is 0.8, and w(t) is greater than 0.5, it indicates that the previous noisy environment has a great impact on the current input speech, it is determined that the current environment type belongs to a noisy environment, and in this case, a speech correction instruction used for speech quality enhancement is output.

When the time difference is 10 seconds, if the previous environment type is a noisy environment, T is 10 seconds, w(t) is 0.5, and w(t) is equal to 0.5, according to inertial setting, it is determined that the current environment is a noisy environment, and in this case, a speech correction instruction used for speech quality enhancement is output.

When the time difference t is 20 seconds, if the previous environment type is a noisy environment, T is 10 seconds, in this case, t>T, and w(t) is 0. Therefore, the previous environment type has no impact on the current speech recognition. Therefore, determining is performed by using the initial environment type and the detection environment that are shown in Embodiment 2 of the present invention. For details, reference may be made to content recorded in Embodiment 2 of the present invention.

If the previous environment type is a quiet environment, T is 20 seconds, and w(t) is 0.5, according to inertial setting, it is determined that the current environment type belongs to a quiet environment, and in this case, a speech correction instruction used for disabling noise reduction processing is output.

Figure 7:
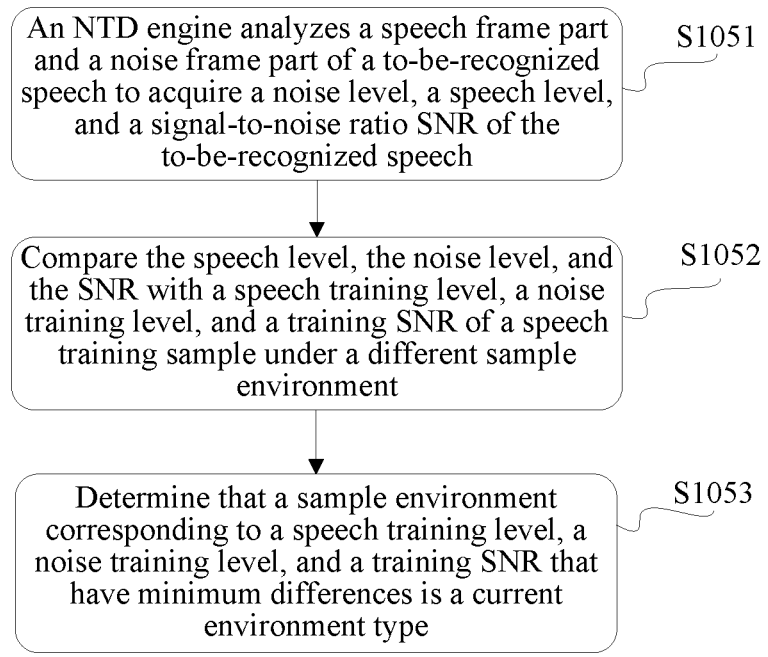
FIG. 7 is a flowchart of determining a current environment type disclosed in Embodiment 3 of the present invention.

Based on the foregoing Embodiment 1 and/or Embodiment 2, for step S105 shown in the foregoing FIG. 1 and FIG. 2: The NTD engine separately compares the received to-be-recognized speech with a speech training sample under a different sample environment, selects a sample environment corresponding to the speech training sample that has a minimum difference with the to-be-recognized speech, as a current environment type, and abandons the current environment type after preset duration. A specific performing process of step S105 is shown in FIG. 7, and mainly includes:

Step S1051: The NTD engine analyzes a speech frame part and a noise frame part of the received to-be-recognized speech to acquire a noise level, a speech level, and a signal-to-noise ratio SNR of the to-be-recognized speech.

In step S1051, the NTD engine acquires the speech frame part and the noise frame part by dividing the acquired to-be-recognized speech according to an energy level, and an analyzing process is as follows: An energy level of the speech frame part and an energy level of the noise frame part are separately calculated to acquire a corresponding speech level and noise level, and the SNR is determined based on that the SNR is equal to a difference between the speech level and the noise level.

Step S1052: Compare the noise level, the speech level, and the signal-to-noise ratio SNR of the to-be-recognized speech with a noise training level, a speech training level, and a training SNR of a speech training sample under a different sample environment, respectively.

Step S1053: Determine that a sample environment type corresponding to a noise training level that has a minimum difference with the noise level, a speech training level that has a minimum difference with the speech level, and a training SNR that has a minimum difference with the SNR is the current environment type.

A principle of a performing process of the foregoing step S1051 to step S1053 is the same as a principle of a performing process of the foregoing step S1021 to step S1025, and a difference only lies in that: the former is processing based on the detection speech, and the latter is processing based on the to-be-recognized speech. Therefore, for a specific performing process, reference may be made to the foregoing step S1021 to step S1025.

Step S1054: Store the current environment type; if the previous environment type exists in the storage area, replace the previous environment type with the current environment type; and if the previous environment type does not exist in the storage area, abandon the current environment type after the preset storage duration.

In step S1054, in a storing process, if old information such as the previous environment type and information related to the previous environment type is stored in the current storage area, the old information is replaced with a currently-determined environment type and information related to the currently-determined environment type; and in the storing process, if the current storage area is empty without any information, the currently-determined environment type and information related to the currently-determined environment type are directly stored, and the currently-stored information is abandoned after the preset storage duration.

The preset storage duration may be set according to different requirements. Generally, whether the preset storage duration may affect recognition of a speech input next time needs to be considered for setting the preset storage duration. For example, the currently-stored environment type is used as the previous environment type for the recognition of a speech input next time. In a more preferred manner, the preset storage duration is set according to effective impact duration of different environment types on the to-be-recognized speech. A specific length of the preset storage duration may be the same as a length of effective impact duration of the currently-stored environment type on the to-be-recognized speech, may also be longer than the effective impact duration, and generally, is not less than the effective impact duration.

According to a speech recognition method disclosed in Embodiment 3 of the present invention, under a co-action of a sample detection type and a previous environment type, a speech correction instruction used for speech quality enhancement or a speech correction instruction used for disabling noise reduction processing is input, so that a speech engine performs corresponding processing on a to-be-recognized speech according to the speech correction instruction. Therefore, a high recognition rate is acquired in a case in which there is no impairment to an original speech, and an NTD engine performs, by using a current environment type calculated and determined by using the to-be-recognized speech, adaptive adjustment on a confidence value of an initial recognition result output by the speech engine, so as to ensure that a finally output speech recognition result has high reliability. Therefore, a purpose of adaptively adjusting speech recognition under various environments is achieved, and it is ensured that a user can acquire good user experience under various environments.

For the speech recognition method disclosed and described in detail in this embodiment of the present invention, the embodiments of the present invention further disclose a speech recognition device that correspondingly performs the foregoing method, and an electronic device that has the speech recognition device, and a specific embodiment is provided in the following for detailed description.

Embodiment 4

Figure 8:
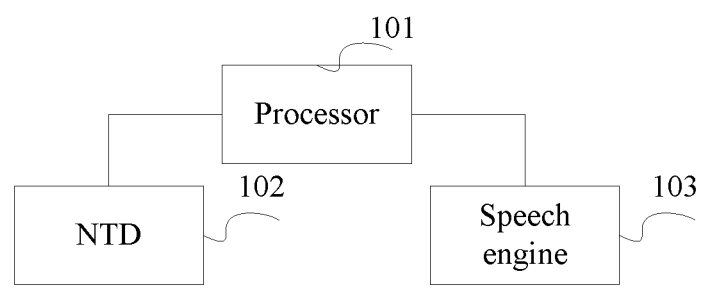
FIG. 8 is a schematic structural diagram of a speech recognition device disclosed in Embodiment 4 of the present invention.

As shown in FIG. 8, FIG. 8 is a schematic structural diagram of a speech recognition device disclosed in Embodiment 4 of the present invention, and the device mainly includes: a processor 101, an NTD engine 102, and a speech engine 103.

The processor 101 is configured to acquire a detection speech and a to-be-recognized speech by sampling an input speech, and input the detection speech and the to-be-recognized speech into the NTD engine 102 and the speech engine 103 at the same time; configured to detect a storage area, and output, when a recognizable previous environment type exists in the storage area, a speech correction instruction according to a result of comparison between a detection environment type output by the NTD engine 102 and the previous environment type; and configured to output a final recognition result after a confidence value of an initial recognition result output by the speech engine 103 is adjusted according to a current environment type output by the NTD engine 102.

A length of speech data included in the detection speech is less than a length of speech data included in the to-be-recognized speech, and the environment type is one of a quiet environment or a noise environment. The NTD engine 102 is configured to separately compare the detection speech and the to-be-recognized speech that are output by the processor 101 with a speech training sample under a different sample environment; select an environment type corresponding to the speech training sample that has a minimum difference with the detection speech, as a detection environment type; select an environment type corresponding to the speech training sample that has a minimum difference with the to-be-recognized speech, as a current environment type; and store the current environment type to the storage area and abandon the current environment type after preset duration.

The speech engine 103 is configured to control correction on the received to-be-recognized speech according to the speech correction instruction output by the processor 101, and output the initial recognition result.

It should be noted that, when the processor 101 performs, according to a detection environment type output by the NTD engine 102 and the previous environment type, determining when a recognizable previous environment type exists in the storage area, and outputs a speech correction instruction, and a specific executing process of the processor 101 is as follows:

Acquire the previous environment type and effective impact duration T of the previous environment type on the speech training sample;

calculate a time difference t between time for inputting the detection speech and time for previously inputting a speech, and an impact value w(t) of the previous environment type on the detection environment type;

determine a balance relationship between the previous environment type and the detection environment type;

output, when both the previous environment type and the detection environment type are noise environments, a speech correction instruction used for speech quality enhancement;

output, when both the previous environment type and the detection environment type are quiet environments, a speech correction instruction used for disabling noise reduction processing;

output, when the previous environment type is a noise environment, the detection environment type is a quiet environment, and w(t)>=0.5, a speech correction instruction used for speech quality enhancement;

output, when the previous environment type is a noise environment, the detection environment type is a quiet environment, and w(t)<0.5, a speech correction instruction used for disabling noise reduction processing; and when w(t)>T, output, when the detection environment type is a quiet environment, a speech correction instruction used for disabling noise reduction processing, and output, when the detection environment type is a noise environment, a speech correction instruction used for speech quality enhancement.

w(t) is a truncation function that decays with time t, a value of the w(t) is obtained by training sample data of a speech training sample under a different sample environment, and values of t and T are positive integers.

When the NTD engine 102 performs comparing the to-be-recognized speech output by the processor 101 with a speech training sample under a different sample environment, and selects an environment type corresponding to the speech training sample that has a minimum difference with the to-be-recognized speech, as a current environment type, a specific performing process of the NTD engine 102 is as follows:

Analyze a speech frame part and a noise frame part of the acquired to-be-recognized speech to acquire a noise level, a speech level, and a signal-to-noise ratio SNR of the to-be-recognized speech; compare the noise level, the speech level, and the signal-to-noise ratio SNR of the to-be-recognized speech with a noise training level, a speech training level, and a training SNR of a speech training sample under a different sample environment respectively; and determine an environment type corresponding to a noise training level that has a minimum difference with the noise level, a speech training level that has a minimum difference with the speech level, and a training SNR that has a minimum difference with the SNR, as the current environment type.

In a process of storing the current environment type to the storage area and abandoning the current environment type after preset duration, if old information such as the previous environment type and information related to the previous environment type is stored in the current storage area, the old information is replaced with the currently-determined current environment type and information related to the currently-determined current environment type; and in a storing process, if the current storage area is empty without any information, the currently-determined current environment type and the information related to the currently-determined current environment type are directly stored, and the currently-stored information is abandoned after preset storage duration.

A method performed by the speech recognition device disclosed in Embodiment 4 of the present invention is the method disclosed in Embodiment 1 of the present invention to Embodiment 3 of the present invention. Therefore, for specific processes of executing the processor 101, the NTD engine 102, and the speech engine 103, reference may be made to the foregoing corresponding method, and details are not described herein again.

Figure 9:
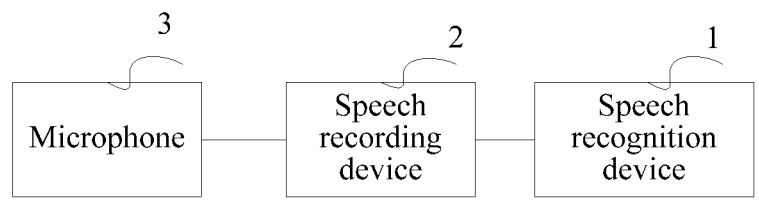
FIG. 9 is a schematic structural diagram of an electronic device disclosed in Embodiment 4 of the present invention.

In addition, Embodiment 4 of the present invention further discloses an electronic device that has the foregoing speech recognition device. As shown in FIG. 9, the electronic device includes at least a speech recording device 2 connected to the speech recognition device 1, and a microphone 3 connected to the speech recording device 2.

Specifically, the speech recording device 2 collects and records a current input speech by using the microphone 3, and inputs the recorded speech to the processor in the speech recognition device 1 for related processing.

It should be noted that, the electronic device that has the speech recognition device and is disclosed in Embodiment 4 of the present invention may be a mobile terminal such as a mobile phone and a PAD, and may also be a fixed terminal that has a microphone and a speech recording device.

In conclusion:

According to a speech recognition method, a speech recognition device, and an electronic device disclosed in the embodiments of the present invention, first under a co-action of a detection environment type of a current input speech and a recognizable previous environment type, a speech correction instruction used to instruct a speech engine whether to correct a to-be-recognized speech is provided, so as to ensure validity of an initial recognition result output at a high recognition rate; then confidence of the initial recognition result is adjusted according to a current environment type acquired according to a calculation result of an NTD engine; and finally, a final recognition result with a high recognition rate and recognition effect for the current input speech is acquired. In this way, it is ensured that under various environments, adaptive adjustment can be performed on speech recognition, so that a user can obtain good speech application experience.

The embodiments in this specification are all described in a progressive manner, for same or similar parts in the embodiments, reference may be made to these embodiments, and each embodiment focuses on a difference with other embodiments. The device disclosed in embodiments corresponds to the method disclosed therein, and therefore is described briefly; for related parts, reference may be made to partial descriptions in the method embodiment.

In combination with the embodiments disclosed in this specification, steps of the methods or algorithms may be implemented by hardware, a software module executed by a processor, or a combination thereof. The software module may be configured in a random access memory (RAM), memory, a read-only memory (ROM), an electrically programmable ROM, an electrically erasable programmable ROM, a register, a hard disk, a removable disk, a CD-ROM, or a storage medium of any other form well-known in the art.

The foregoing descriptions of the disclosed embodiments help a person skilled in the art implement or use the present invention. Various modifications to the embodiments are obvious to the person skilled in the art, and general principles defined in this specification may be implemented in other embodiments without departing from the spirit or scope of the present invention. Therefore, the present invention will not be limited to the embodiments described in this specification but conforms to the widest scope that complies with the principles and novelty disclosed in this specification.

What is claimed is:

1. A speech recognition method, comprising:
   receiving, by a speech recognition device, an input speech, wherein the speech recognition device comprises a noise type detection engine, a storage area and a speech engine;
   dividing the input speech, by the speech recognition device, into detection speech at a beginning of the input speech and a to-be-recognized speech following the detection speech, wherein a length of speech data comprised in the detection speech is less than a length of speech data comprised in the to-be-recognized speech;
   selecting, by the noise type detection engine based on comparing the detection speech with a plurality of speech training samples under a plurality of different sample environments, a sample environment corresponding to a speech training sample among the plurality of speech training samples that has a minimum difference with the detection speech, as a detection environment type, wherein the plurality of sample environments comprises a quiet environment and a noise environment;
   detecting, by the speech recognition device, a storage area;
   outputting, by the speech recognition device, when a recognizable previous environment type exists in the storage area, a speech correction instruction according to a result of comparison between the detection environment type and the previous environment type, wherein the previous environment type comprises a quiet environment or a noise environment;
   controlling, by the speech engine according to the speech correction instruction, correction on the to-be-recognized speech, and outputting an initial recognition result;
   separately comparing, by the noise type detection engine, the received to-be-recognized speech with the plurality of the speech training samples, and selecting a sample environment corresponding to a speech training sample among the plurality of speech training samples that has a minimum difference with the to-be-recognized speech, as a current environment type;
   storing, by the speech recognition device, the current environment type to the storage area, and abandoning the current environment type after a preset duration; and
   outputting, by the speech recognition device, a final recognition result after a confidence value of the initial recognition result is adjusted according to the current environment type.

2. The method according to claim 1, wherein when the previous environment type is not recognized in the storage area, the method further comprises:
   acquiring, by the speech recognition device, a pre-stored initial environment type, wherein the initial environment type comprises a quiet environment or a noise environment; and
   determining, by the speech recognition device, according to the initial environment type and the detection environment type, and outputting the speech correction instruction.

3. The method according to claim 2, wherein the determining, by the speech recognition device, according to the initial environment type and the detection environment type, and outputting the speech correction instruction comprises:
   determining, by the speech recognition device, whether the initial environment type is the same as the detection environment type;
   if the initial environment type is the same as the detection environment type, outputting by the speech recognition device, when both the initial environment type and the detection environment type are noise environments, a speech correction instruction used for speech quality enhancement, and outputting by the speech recognition device, when both the initial environment type and the detection environment type are quiet environments, a speech correction instruction used for disabling noise reduction processing; and
   if the initial environment type is not the same as the detection environment type, outputting by the speech recognition device, when the initial environment type is a noise environment, a speech correction instruction used for speech quality enhancement, and outputting by the speech recognition device, when the initial environment type is a quiet environment, a speech correction instruction used for disabling noise reduction processing.

4. The method according to claim 1, wherein the outputting by the speech recognition device, when a recognizable previous environment type exists in the storage area, a speech correction instruction according to a result of comparison between the detection environment type and the previous environment type comprises:
   acquiring the previous environment type and effective impact duration T of the previous environment type on the input speech;
   calculating a time difference t between time for inputting the detection speech and time for previously inputting a speech, and an impact value w(t) of the previous environment type on the detection environment type, wherein w(t) is a truncation function that decays with time t, a value of w(t) is obtained by training sample data of a speech training sample under a different sample environment, and values of t and T are positive integers;
   determining a balance relationship between the previous environment type and the detection environment type;
   outputting, when both the previous environment type and the detection environment type are noise environments, a speech correction instruction used for speech quality enhancement;
   outputting, when both the previous environment type and the detection environment type are quiet environments, a speech correction instruction used for disabling noise reduction processing;
   outputting, when the previous environment type is a noise environment, the detection environment type is a quiet environment, and w(t)>=0.5, a speech correction instruction used for speech quality enhancement;

outputting, when the previous environment type is a noise environment, the detection environment type is a quiet environment, and w(t)<0.5, a speech correction instruction used for disabling noise reduction processing; and when the w(t)>T, outputting, when the detection environment type is a quiet environment, a speech correction instruction used for disabling noise reduction processing, and outputting, when the detection environment is a noise environment, a speech correction instruction used for speech quality enhancement.

5. The method according to claim 1, wherein the separately comparing, by the noise type detection engine, the received to-be-recognized speech with a speech training sample under a different sample environment, and selecting a sample environment corresponding to a speech training sample that has a minimum difference with the to-be-recognized speech, as a current environment type comprises:

analyzing, by the noise type detection engine, a speech frame part and a noise frame part of the received to-be-recognized speech to acquire a noise level, a speech level, and a signal-to-noise ratio (SNR) of the to-be-recognized speech;

comparing the noise level, the speech level, and the SNR of the to-be-recognized speech with a noise training level, a speech training level, and a training SNR of a speech training sample under a different sample environment, respectively; and determining that a sample environment corresponding to a noise training level that has a minimum difference with the noise level, a speech training level that has a minimum difference with the speech level, and a training SNR that has a minimum difference with the SNR is the current environment type.

6. The method according to claim 1, wherein the preset duration when the current environment type is a quiet environment is longer than the preset duration when the current environment type is a noise environment.

7. The method according to claim 1, wherein the noise environment comprises: a vehicle-mounted low noise environment, a vehicle-mounted high noise environment, an ordinary roadside environment, a busy roadside environment, and a noisy environment.

8. A speech recognition device, comprising:

a processor, configured to:

acquire a detection speech and a to-be-recognized following the detection speech by sampling an input speech, and input the detection speech and the to-be-recognized speech into a noise type detection engine and a speech engine at the same time;

detect a storage area, and output, when a recognizable previous environment type exists in the storage area, a speech correction instruction according to a result of comparison between a detection environment type output by the noise type detection engine in response to receiving the detection speech and the to-be-recognized speech and the previous environment type; and output a final recognition result after a confidence value of an initial recognition result output by the engine is adjusted according to a current environment type output by the noise type detection engine, wherein a length of speech data comprised in the detection speech is less than a length of speech data comprised in the to-be-recognized speech, and the previous environment type is a quiet environment or a noise environment;

the noise type detection engine interfaced to the processor, configured to:

separately compare the detection speech and the to-be-recognized speech that are output by the processor with a plurality of speech training samples under a plurality of different sample environments;

select a sample environment corresponding to a speech training sample that has a minimum difference with the detection speech, as a detection environment type;

select a sample environment corresponding to a speech training sample that has a minimum difference with the to-be-recognized speech, as a current environment type; and store the current environment type to the storage area, and abandon the current environment type after preset duration; and the speech engine interfaced to the noise type detection engine and the processor, configured to receive the speech correction instruction from the processor and control correction on the received to-be-recognized speech according to the speech correction instruction output by the processor, and output an initial recognition result.

9. The device according to claim 8, wherein the processor, configured to detect a storage area, and output, when a recognizable previous environment exists in the storage area, a speech correction instruction according to a result of comparison between a detection environment type output by the noise type detection engine and the previous environment type comprises:

the processor, configured to acquire the previous environment type and effective impact duration T of the previous environment type on the input speech; calculate a time difference t between time for inputting the detection speech and time for previously inputting a speech, and an impact value w(t) of the previous environment type on the detection environment type; determine a balance relationship between the previous environment type and the detection environment type; output, when both the previous environment type and the detection environment type are noise environments a speech correction instruction used for speech quality enhancement; output, when both the previous environment type and the detection environment type are quiet environments, a speech correction instruction used for disabling noise reduction processing; output, when the previous environment type is a noise environment, the detection environment is a quiet environment, and w(t)>=0.5, a speech correction instruction used for speech quality enhancement; output, when the previous environment type is a noise environment, the detection environment is a quiet environment, and w(t)<0.5, a speech correction instruction used for disabling noise reduction processing; and when w(t)>T, output, when the detection environment type is a quiet environment, a speech correction instruction used for disabling noise reduction processing; and output, when the detection environment type is a noise environment, a speech correction instruction used for speech quality enhancement, wherein w(t) is a truncation function that decays with time t, a value of w(t) is obtained by training sample data of a speech training sample under a different sample environment, and values of t and T are positive integers.

10. The device according to claim 8, wherein the noise type detection engine, configured to compare the to-be-recognized speech output by the processor with a speech training sample under a different sample environment; select a sample environment corresponding to a speech training sample that has a minimum difference with the to-be-recognized speech, as a current environment type comprises:
the noise type detection engine, configured to analyze a speech frame part and a noise frame part of the received to-be-recognized speech to acquire a noise level, a speech level, and a signal-to-noise ratio (SNR) of the to-be-recognized speech; compare the noise level, the speech level, and the SNR of the to-be-recognized speech with a noise training level, a speech training level, and a training SNR of a speech training sample under a different sample environment, respectively; and determine that a sample environment corresponding to a noise training level that has a minimum difference with the noise level, a speech training level that has a minimum difference with the speech level, and a training SNR that has a minimum difference with the SNR is the current environment type.

11. An electronic device, comprising a speech recognition device, a speech recording device connected to the speech recognition device, and a microphone connected to the recording device;
wherein the speech recording device is configured to collect and record an input speech by using the microphone, and is configured to input the recorded input speech to the speech recognition device;
wherein the speech recognition device is configured to:
receive an input speech;
divide the input into a detection speech at the beginning of the input speech and a to-be-recognized speech following the detection speech, wherein a length of speech data comprised in the detection speech is less than a length of speech data comprised in the to-be-recognized speech;
select, after comparing the detection speech with a plurality of speech training samples under a plurality of different sample environments, a sample environment corresponding to a speech training sample among the plurality of speech training samples that has a minimum difference with the detection speech, as a detection environment type, wherein the sample environment comprises a quiet environment and a noise environment;
detect a storage area in the speech recognition device;
output, when a recognizable previous environment type exists in the storage area, a speech correction instruction according to a result of comparison between the detection environment type and the previous environment type, wherein the previous environment type is a quiet environment or a noise environment;
control, according to the speech correction instruction, correction on the to-be-recognized speech, and output an initial recognition result;
separately compare the received to-be-recognized speech with the plurality of speech training samples, and select sample environment corresponding to a speech training sample among the plurality of speech training samples that has a minimum difference with the to-be-recognized speech, as a current environment type;
store the current environment type to the storage area, and abandon the current environment type after preset duration; and
output a final recognition result after a confidence value of the initial recognition result is adjusted according to the current environment type.

12. The electronic device according to claim 11, wherein when the previous environment type is not recognized in the storage area, the speech recording device is further configured to:
acquire a pre-stored initial environment type, wherein the initial environment type comprises a quiet environment or a noise environment;
determine according to the initial environment type and the detection environment type; and
output the speech correction instruction.

13. The electronic device according to claim 12, wherein the determine according to the initial environment type and the detection environment type, and output the speech correction instruction comprises:
determine whether the initial environment type is the same as the detection environment type;
if the initial environment type is the same as the detection environment type, output a speech correction instruction used for speech quality enhancement when both the initial environment type and the detection environment type are noise environments, and output a speech correction instruction used for disabling noise reduction processing when both the initial environment type and the detection environment type are quiet environments; and
if the initial environment type is not the same as the detection environment type, output a speech correction instruction used for speech quality enhancement when the initial environment type is a noise environment, and output a speech correction instruction used for disabling noise reduction processing when the initial environment type is a quiet environment.

14. The electronic device according to claim 11, wherein the output, when a recognizable previous environment type exists in the storage area, a speech correction instruction according to a result of comparison between the detection environment type and the previous environment type comprises:
acquire the previous environment type and effective impact duration T of the previous environment type on the input speech;
calculate a time difference t between time for inputting the detection speech and time for previously inputting a speech, and an impact value w(t) of the previous environment type on the detection environment type, wherein w(t) is a truncation function that decays with time t, a value of w(t) is obtained by training sample data of a speech training sample under a different sample environment, and values of t and T are positive integers;
determine a balance relationship between the previous environment type and the detection environment type;
output, when both the previous environment type and the detection environment type are noise environments, a speech correction instruction used for speech quality enhancement;
output, when both the previous environment type and the detection environment type are quiet environments, a speech correction instruction used for disabling noise reduction processing;

output, when the previous environment type is a noise environment, the detection environment type is a quiet environment, and w(t)>=0.5, a speech correction instruction used for speech quality enhancement;

output, when the previous environment type is a noise environment, the detection environment type is a quiet environment, and w(t)<0.5, a speech correction instruction used for disabling noise reduction processing; and when the w(t)>T, output, when the detection environment type is a quiet environment, a speech correction instruction used for disabling noise reduction processing, and output, when the detection environment is a noise environment, a speech correction instruction used for speech quality enhancement.

15. The electronic device according to claim 11, wherein the separately compare the received to-be-recognized speech with a speech training sample under a different sample environment, and select a sample environment corresponding to a speech training sample that has a minimum difference with the to-be-recognized speech, as a current environment type comprises:

analyze a speech frame part and a noise frame part of the received to-be-recognized speech to acquire a noise level, a speech level, and a signal-to-noise ratio (SNR) of the to-be-recognized speech;

compare the noise level, the speech level, and the SNR of the to-be-recognized speech with a noise training level, a speech training level, and a training SNR of a speech training sample under a different sample environment, respectively; and determine that a sample environment corresponding to a noise training level that has a minimum difference with the noise level, a speech training level that has a minimum difference with the speech level, and a training SNR that has a minimum difference with the SNR is the current environment type.

16. The electronic device according to claim 11, wherein the preset duration when the current environment type is a quiet environment is longer than the preset duration when the current environment type is a noise environment.

17. The electronic device according to claim 11, wherein the noise environment comprises: a vehicle-mounted low noise environment, a vehicle-mounted high noise environment, an ordinary roadside environment, a busy roadside environment, and a noisy environment.

* * * * *